(12) United States Patent
Whitmer

(10) Patent No.: US 10,838,820 B1
(45) Date of Patent: Nov. 17, 2020

(54) APPLICATION LEVEL SUPPORT FOR SELECTIVELY ACCESSING FILES IN CLOUD-BASED STORAGE

(71) Applicant: EMC IP Holding Company LLC, Hopkinton, MA (US)

(72) Inventor: Ray David Whitmer, Pleasant Grove, UT (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 385 days.

(21) Appl. No.: 15/670,444

(22) Filed: Aug. 7, 2017

Related U.S. Application Data

(63) Continuation of application No. 14/578,168, filed on Dec. 19, 2014, now Pat. No. 9,753,814.

(51) Int. Cl.
G06F 16/00 (2019.01)
G06F 11/14 (2006.01)
H04L 29/08 (2006.01)

(52) U.S. Cl.
CPC ...... *G06F 11/1451* (2013.01); *H04L 67/1097* (2013.01); *G06F 2201/855* (2013.01)

(58) Field of Classification Search
CPC ........... G06F 11/1451; G06F 2201/855; G06F 16/128; G06F 16/27; H04L 67/1097
See application file for complete search history.

(56) References Cited

U.S. PATENT DOCUMENTS

| | | |
|---|---|---|
| 5,944,789 A | 8/1999 | Tzelnic et al. |
| 7,769,967 B2 | 8/2010 | Zhu et al. |
| 7,873,601 B1 | 1/2011 | Kushwah |
| 8,112,505 B1 | 2/2012 | Ben-Shaul |
| 8,166,263 B2 | 4/2012 | Prahlad |
| 8,200,926 B1 | 6/2012 | Stringham |
| 8,285,682 B2 | 10/2012 | Oza |
| 8,312,356 B1 | 11/2012 | Cousins |
| 8,335,238 B2 | 12/2012 | Arimilli |
| 8,447,826 B1 | 5/2013 | Manmohan et al. |
| 8,489,671 B2 | 7/2013 | Lepeska |
| 8,639,781 B1 | 1/2014 | Motes |
| 8,725,687 B2 | 5/2014 | Klose |
| 8,732,479 B1 | 5/2014 | Henriksen |
| 8,825,653 B1 * | 9/2014 | Wang ..................... G06F 16/137 707/737 |
| 8,849,878 B1 | 9/2014 | Bachu |
| 8,904,125 B1 * | 12/2014 | Elling ................. G06F 11/1451 711/162 |
| 8,954,663 B1 | 2/2015 | Klein |

(Continued)

OTHER PUBLICATIONS

U.S. Appl. No. 14/578,113, filed Dec. 19, 2014, Whitmer.

(Continued)

*Primary Examiner* — Noosha Arjomandi
(74) *Attorney, Agent, or Firm* — Workman Nydegger

(57) ABSTRACT

In one example, a method includes accessing a manifest that includes a listing of available versions of a dataset, selecting a dataset from the manifest, mounting the selected dataset, running an application that is associated with the dataset, requesting a specific subset of data of the mounted dataset, receiving the requested subset of data, performing a file system operation involving a change to the subset of data, and backing up the change to the subset of data.

20 Claims, 7 Drawing Sheets

(56) References Cited

U.S. PATENT DOCUMENTS

| | | | |
|---|---|---|---|
| 9,003,458 B2 | 4/2015 | Gonder | |
| 9,021,222 B1 | 4/2015 | Sadhu | |
| 9,092,248 B1 | 7/2015 | Makin | |
| 9,141,542 B1 | 9/2015 | Justiss | |
| 9,680,954 B2 | 6/2017 | Park | |
| 9,753,814 B1 | 9/2017 | Whitmer | |
| 9,996,429 B1* | 6/2018 | Kumar | G06F 11/1451 |
| 10,102,080 B1* | 10/2018 | Gruszka | G06F 11/1453 |
| 10,416,922 B1* | 9/2019 | Rangapuram | G06F 11/1451 |
| 2001/0013102 A1 | 8/2001 | Tsuchiya | |
| 2003/0158861 A1* | 8/2003 | Sawdon | G06F 11/2097 |
| 2004/0206982 A1 | 10/2004 | Lee | |
| 2005/0251516 A1 | 11/2005 | Stakutis | |
| 2007/0038815 A1* | 2/2007 | Hughes | H04L 12/66 711/147 |
| 2007/0088760 A1 | 4/2007 | Okitsu | |
| 2007/0094452 A1 | 4/2007 | Fachan | |
| 2007/0185936 A1 | 8/2007 | Derk et al. | |
| 2007/0276885 A1 | 11/2007 | Valiyaparambil | |
| 2008/0005201 A1 | 1/2008 | Ting | |
| 2008/0183767 A1 | 7/2008 | Zhu | |
| 2009/0077263 A1* | 3/2009 | Koganti | G06F 16/27 709/248 |
| 2009/0276592 A1* | 11/2009 | Reed | G06F 3/065 711/162 |
| 2009/0313322 A1 | 12/2009 | Sheehan | |
| 2010/0174745 A1 | 7/2010 | Ryan | |
| 2010/0241726 A1 | 9/2010 | Wu | |
| 2010/0268902 A1 | 10/2010 | Drobychev | |
| 2010/0274784 A1 | 10/2010 | Acharya | |
| 2010/0293147 A1 | 11/2010 | Snow | |
| 2011/0059730 A1 | 3/2011 | Scriven et al. | |
| 2011/0167435 A1 | 7/2011 | Fang | |
| 2011/0185355 A1* | 7/2011 | Chawla | G06F 9/5077 718/1 |
| 2011/0191445 A1 | 8/2011 | Dazzi | |
| 2011/0196822 A1* | 8/2011 | Zunger | G06F 16/27 707/609 |
| 2011/0196833 A1* | 8/2011 | Drobychev | G06F 16/248 707/634 |
| 2012/0005670 A1 | 1/2012 | Driesen | |
| 2012/0215882 A1 | 8/2012 | Goto | |
| 2012/0324056 A1* | 12/2012 | Miles | H04L 69/163 709/219 |
| 2012/0331108 A1 | 12/2012 | Ferdowsi | |
| 2013/0064370 A1 | 3/2013 | Gouge | |
| 2013/0075380 A1 | 3/2013 | Albrech et al. | |
| 2013/0097117 A1* | 4/2013 | Lasky | G06F 11/1471 707/624 |
| 2013/0151884 A1 | 6/2013 | Hsu | |
| 2013/0212074 A1* | 8/2013 | Romanski | G06F 12/0253 707/692 |
| 2013/0226888 A1 | 8/2013 | Govind | |
| 2013/0239129 A1 | 9/2013 | Kim | |
| 2014/0006357 A1* | 1/2014 | Davis | G06F 16/182 707/667 |
| 2014/0040286 A1 | 2/2014 | Bane | |
| 2014/0095625 A1 | 4/2014 | Quan | |
| 2014/0095813 A1 | 4/2014 | Shukla et al. | |
| 2014/0101298 A1 | 4/2014 | Shukla et al. | |
| 2014/0108755 A1 | 4/2014 | Lue | |
| 2014/0108956 A1 | 4/2014 | Varenhorst | |
| 2014/0181051 A1 | 6/2014 | Montulli et al. | |
| 2014/0201154 A1 | 7/2014 | Varadharajan | |
| 2014/0201155 A1 | 7/2014 | Vijayan | |
| 2014/0244937 A1 | 8/2014 | Bloomstein et al. | |
| 2014/0279846 A1 | 9/2014 | Srinivasan | |
| 2014/0279956 A1 | 9/2014 | Trimble | |
| 2014/0304243 A1 | 10/2014 | Ramesh | |
| 2014/0310245 A1 | 10/2014 | Novick | |
| 2015/0046106 A1 | 2/2015 | Wade et al. | |
| 2015/0089558 A1 | 3/2015 | Shimizu | |
| 2015/0227533 A1* | 8/2015 | Goldstein | G06F 16/2379 707/661 |
| 2015/0293699 A1 | 10/2015 | Bromley | |
| 2015/0293986 A1 | 10/2015 | Verge | |
| 2016/0004718 A1 | 1/2016 | Lin et al. | |
| 2016/0072886 A1 | 3/2016 | Lin et al. | |
| 2016/0094585 A1 | 3/2016 | Shahbazian | |
| 2016/0378528 A1* | 12/2016 | Zamir | G06F 3/0679 711/162 |
| 2017/0329543 A1 | 11/2017 | Slater | |
| 2017/0329683 A1* | 11/2017 | Lien | G06F 3/0619 |
| 2018/0062956 A1* | 3/2018 | Schultz | H04L 41/22 |

OTHER PUBLICATIONS

U.S. Appl. No. 14/578,151, filed Dec. 19, 2014, Whitmer.
U.S. Appl. No. 14/578,162, filed Dec. 19, 2014, Whitmer, et al.
U.S. Appl. No. 14/578,168, filed Dec. 19, 2014, Whitmer.
U.S. Appl. No. 14/578,172, filed Dec. 19, 2014, Whitmer.
U.S. Appl. No. 15/648,116, filed Jul. 12, 2017, Whitmer.
Symantec, Difference between synthetic backup/optimised synthetic backup and virtual synthetic backup, created Nov. 22, 2012, symantec.com, http://www.symantec.com/connect/forums/difference-between-synthetic-backup-optimised-synthetic-backup-and-virtual-synthetic-backup.
U.S. Appl. No. 14/578,151, Feb. 8, 2017, Office Action.
U.S. Appl. No. 14/578,162, Feb. 10, 2017, Office Action.
U.S. Appl. No. 14/578,113, May 3, 2017, Office Action.
U.S. Appl. No. 14/578,168, May 11, 2017, Notice of Allowance.
U.S. Appl. No. 14/578,151, Jul. 11, 2017, Office Action.
U.S. Appl. No. 14/578,113, May 24, 2018, Notice of Allowance.
U.S. Appl. No. 14/578,172, May 31, 2018, Notice of Allowance.
U.S. Appl. No. 14/578,168, Jun. 7, 2018, Notice of Allowance.
U.S. Appl. No. 14/578,172, Oct. 18, 2017, Office Action.
U.S. Appl. No. 14/578,113, Nov. 16, 2017, Final Office Action.
U.S. Appl. No. 14/578,151, Jan. 10, 2018, Final Office Action.
U.S. Appl. No. 14/578,162, Feb. 26, 2018, Final Office Action.
U.S. Appl. No. 14/578,113, Feb. 26, 2018, Advisory Action/Interview Summary.
U.S. Appl. No. 14/578,162, Aug. 15, 2017, Office Action
U.S. Appl. No. 15/648,116, May 14, 2020, Office Action.
U.S. Appl. No. 16/122,670, filed Sep. 5, 2018, Whitmer.
U.S. Appl. No. 16/122,688, filed Sep. 5, 2018, Whitmer.
U.S. Appl. No. 16/264,403, filed Jan. 31, 2019, Whitmer.
U.S. Appl. No. 14/578,151, Jan. 4, 2019, Notice of Allowance.
U.S. Appl. No. 15/648,116, Jun. 13, 2019, Office Action.
U.S. Appl. No. 15/648,116, Dec. 10, 2020, Final Office ACtion.
U.S. Appl. No. 16/122,670, Sep. 26, 2019, Office Action.
U.S. Appl. No. 16/122,670, Mar. 13, 2020, Office Action.

\* cited by examiner

1

APPLICATION LEVEL SUPPORT FOR SELECTIVELY ACCESSING FILES IN CLOUD-BASED STORAGE

RELATED APPLICATIONS

This application is a continuation of, and hereby claims priority to, U.S. patent application Ser. No. 14/578,168, entitled APPLICATION LEVEL SUPPORT FOR SELECTIVELY ACCESSING FILES IN CLOUD-BASED STORAGE, and filed Dec. 19, 2014. The aforementioned application is incorporated herein in its entirety by this reference.

FIELD OF THE INVENTION

Embodiments of the present invention generally concern mechanisms for enabling user access to data stored at a datacenter. More particularly, at least some embodiments of the invention relate to systems, hardware, computer-readable media, and methods for backing up and restoring data that corresponds to less than an entire dataset, such as a byte range within a dataset.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

Increasingly, entities have chosen to back up their important data using cloud based storage. The cloud based approach to backup has proven attractive because it can reduce, or eliminate, the need for the entity to purchase and maintain its own backup hardware. Cloud based storage is also flexible in that it can enable users anywhere in the world to access the data stored in the cloud datacenter. As well, the user data is protected from a disaster at the user location because the user data is stored in the cloud data center, rather than on backup hardware at the user location.

While advantageous in certain regards, the use of cloud based storage has introduced some new problems however. For example, some cloud based storage systems and services require that a user download an entire file from the datacenter to the local user machine before the user can fully access that file. Depending upon the size of the file and the capacity of the communication line connecting the user with the datacenter, this process can be unacceptably long. For example, it can take a significant amount of time to restore a database, mailbox, or virtual machine disk file.

Moreover, there may not be a need to restore the entire file to the local user machine. This circumstance can arise where, for example, it is adequate for the purposes of a user to restore a dataset that is only a subset of a larger dataset. To illustrate, a user may only need to restore a particular email, and does not need to restore the entire mailbox that includes the email.

In light of problems and shortcomings such as those noted above, it would be useful to be able to store a dataset in such a way that individual portions of the dataset are independent of each other. As well, it would be useful to be able to map and track changes associated with the configuration and location of those individual portions so that one or more selected portions can be retrieved, on an individual basis if called for. As well, it would be useful for a requestor to specify which portion or portions of a stored dataset are desired to be retrieved by the requestor. Finally, it would be useful to be able to provide these functions, among others, in a variety of scenarios and use cases, examples of which include disaster recovery, and live access to databases, email repositories such as mailboxes, and other data sources of various sizes and types.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
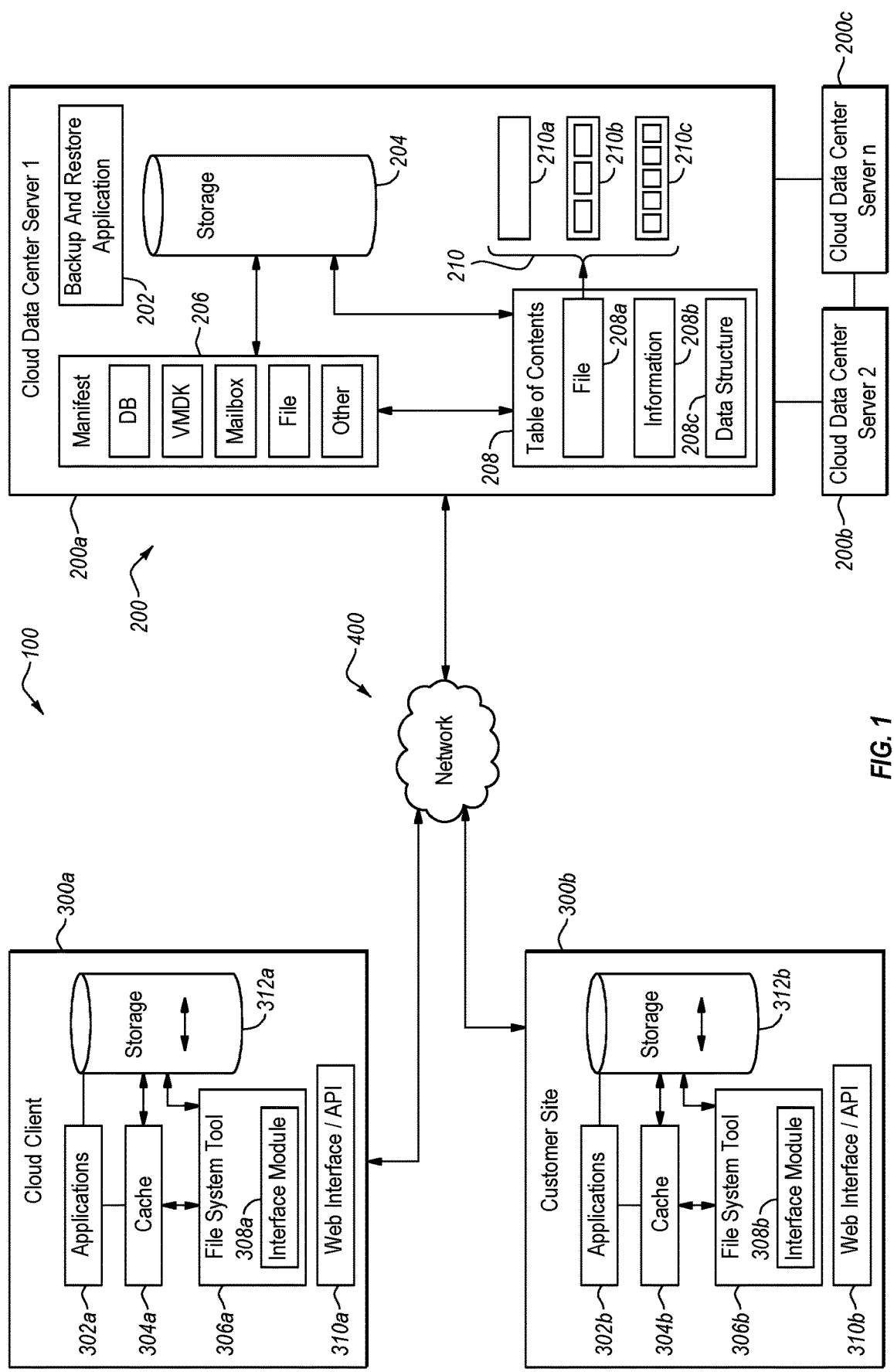
FIG. 1 is directed to aspects of an example operating environment for at least some embodiments.

Embodiments of the present invention generally concern systems, hardware, computer-readable media and methods for performing data backup, retrieval and restore operations in environments, such as cloud environments for example, that include a datacenter where one or more backups are stored. For example, user data is backed up from one or more clients, which can be cloud based computing systems and/or customer sites for example, to one or more backup servers of a cloud based datacenter. The backed up data can then be retrieved for use by the user, and/or can be restored to a client in a disaster recovery scenario.

When a disaster or other event occurs that compromises or renders locally stored data inaccessible or unusable, there is a need to quickly and efficiently provide users with access to the backup of that data until such time as the lost or compromised data can be locally restored. To this end, example embodiments disclosed herein enable a user to directly access data stored in a cloud based datacenter. As well, such embodiments can eliminate the requirement to download entire user data objects such as files, file structures, or other datasets, as a prerequisite to user access to the data. More specifically, such embodiments enable a user to identify and download from the datacenter only that data that is necessary for operations desired to be performed by the user with an application. In this way, the relative size of downloads needed may be reduced, and the relative speed with which such downloads can be implemented may be increased.

At least some embodiments are implemented in connection with a datacenter in the form of cloud based storage. The cloud datacenter may be accessible to one or more cloud clients and/or to one or more customer sites. As well, the cloud datacenter may be directly accessible by cloud clients and customer sites or, alternatively, the cloud clients and/or customer sites can access the cloud datacenter by way of an intermediate network.

The cloud datacenter can provide encryption and compression services, although neither is necessarily required. In some embodiments at least, all data stored by the cloud datacenter, and communicated by the cloud datacenter to the user, may be in encrypted form so that that the user can be assured of data integrity and security.

In one example embodiment, a baseline dataset is stored at the datacenter, such as after a file is first created, for example. The baseline dataset backed up at the datacenter can include a plurality of blocks which may differ in size from each other, although that is not required and two or more of the blocks of the baseline dataset can be the same size as each other. As well, one, some, or all, of the blocks in the baseline dataset can be configured to have a variable size such that, for example, when changes are made relative to a particular block of the baseline dataset or of a prior backup of that dataset, the newer backup version of that block that reflects those changes may be larger, or smaller, than the particular block was when that particular block was previously stored, whether as part of the baseline dataset and/or as part of a backup that occurred prior to the newer, more recent backup.

Because the backup may consist of fewer than all the blocks in the baseline dataset, it can be referred to as an incremental backup. The use of incremental backups, sometimes referred to simply as incrementals, can be advantageous inasmuch as the amount of storage required to store an incremental, which includes only blocks that have been modified, is typically much less than would be required to store a new version of the entire file that includes the changes reflected in the incremental.

Due to the fact that block sizes can change from one backup to another, the location of start and/or endpoints of any given block, or blocks, may vary. Thus, a table of contents can be provided at the datacenter that, in brief, keeps track of the locations of the stored blocks. In some particular embodiments, the table of contents includes, or is associated with, a map that is in turn associated with one or more reference blocks that include information concerning where a particular block or blocks are located at the datacenter. The reference blocks can be created at the datacenter when, for example, an incremental is stored. In at least some embodiments, the reference blocks are stored together with the incremental to which they correspond. The reference blocks may be quite small in terms of their size such that even where an incremental includes numerous blocks, each block being associated with a respective reference block, the cumulative space occupied by the reference blocks is relatively negligible.

At some point after the incrementals have been backed up and mapped, a web-based tool residing on a client such as a user machine can be used to initiate a process to enable a user to access datacenter data, such an incremental pertaining to a baseline dataset. Such access may be needed as part of a disaster recovery, and/or other, operation(s).

Among other things, the tool can operate in connection with an interface module at the user machine to communicate with the datacenter and present datacenter data to the user in such a way that the data appears to the user as, for example, a local file system, notwithstanding that the data actually resides at the cloud datacenter. Once the datacenter data is presented in this fashion, the user can then select, using a GUI for example, a desired dataset to be retrieved.

As well, the tool interfaces with one or more applications to enable a user to identify a dataset of interest associated with an application, and then request that only specific portions of the dataset be downloaded from the cloud datacenter to the user machine. By way of example, the tool can interface with a mail system, such as MS Exchange®, to request that a particular mailbox, or portion of a mailbox, be downloaded from the datacenter. Such datasets could include any data of interest to a user, such as, for example, a database, file structure, a file, a virtual machine file such as a .VMDK (virtual machine disk file developed by VMware), or any other data object(s) to which the user requires access. In one particular embodiment, the tool can identify and request specific data at the block level.

When the datacenter receives the user data request, the datacenter can then retrieve the requested data, which may be a specific file, or only a portion of a file, for example. In one particular example, the datacenter retrieves the file as the file existed at a particular point in time. The data retrieved by the datacenter can be used to create a virtual synthetic that can then be made available to the client. As such, the file or file portion may reflect any number of incremental changes that have been made between the time the file or file portion was first stored at the datacenter and the time that the file or file portion was retrieved by the user. Further details concerning processes for identifying, requesting, retrieving, and/or assembling, the data are provided in the applications identified in the RELATED APPLICATIONS section hereof.

Where only a portion of a file or other dataset is mounted on a client device, that portion may be referred to as a virtual synthetic. That is, the portion that is mounted is synthetic in the sense that the portion is created, or synthesized, on an ad-hoc basis according to user requirements and the portion does not exist separately on its own at the datacenter. Further, the synthetic is referred to as virtual because it is presented, and appears, to a user as though the synthetic does separately exist.

In at least some embodiments, the datacenter can employ a manifest that lists various types of datasets that can be retrieved, either in whole or in part, by a user. As noted above, such datasets could include, for example, a database, a file structure, and various types of individual files such as .VMDK files, and mailbox files. A table of contents at the datacenter includes one or more entries for each file. Each entry is associated with a mapping that identifies, for example, a byte range associated with a file, where the bytes of the byte range are stored, and compression information associated with bytes of a byte range. The datacenter can use the manifest and table of contents to identify, locate, and return the requested file to the user.

The retrieved file or file portion is then mounted and becomes accessible to the requesting application at the user machine. In at least some embodiments, part or all of the requested data is cached at the user machine. Where the file is relatively small, the entire file can be mounted on the user machine. However, where the file is relatively large, only those portions of the file actually needed by the user are downloaded to the user machine. Advantageously then, a relative reduction in transmission bandwidth, and transmission time, can be achieved with embodiments of the invention.

As suggested above, the datacenter can receive, store, and transmit data in an encrypted form to help ensure the integrity of the data. Because the data is always encrypted, and only the user has the decryption key, the user has some assurance that there will be no unauthorized access to the data. Accordingly, the data requested and received by the user may require decryption and decompression after the file has been mounted. Once any decryption and decompression have been performed, the associated application at the user location can then access and manipulate the retrieved file.

Finally, any changes to the file can be locally cached and/or returned to the datacenter, and the manifest and table of contents at the datacenter updated accordingly. The changes can be compressed and encrypted prior to transmission to the datacenter.

A. Example Operating Environments

In general, embodiments of the invention may include and/or be implemented in an operating environment that includes one or more clients and one or more backup servers. As used herein, the term client is intended to have broad scope and embraces, among other things, any system, device, or combination of those, by way of which direct access to cloud based storage can be achieved. As such, one or more clients may be in a cloud system, and/or one or more clients may be located at a customer site. Similarly, the term backup server is intended to have broad scope, and embraces, among other things, any backup server and associated storage device or system that are located remotely relative to a client. As such, one or more backup servers may be part of a cloud based storage system, such as a cloud datacenter for example.

With attention now to FIG. 1, details are provided concerning some operating environments, one example of which is denoted at 100, in connection with which various embodiments of the invention may be employed. In FIG. 1, the example operating environment 100 may be a network such as a local area network, a wide area network, the internet, or any other networked configuration. Moreover, the operating environment 100, or any group of one or more of its elements, may comprise, form an element of, or constitute, a cloud computing environment. The environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a cloud datacenter 200 that may include one or more cloud datacenter servers, such as datacenter servers 200a, 200b and 200c. For the purposes of the discussion, only datacenter server 200a will be discussed but it should be understood that datacenter servers 200b and 200c may be similar, or identical, to datacenter server 200a in terms of operation and/or configuration. In at least some embodiments, two or more of the datacenter servers 200a-200c can communicate with each other, although that is not required. In general, the datacenter server 200a is implemented as a backup server that is able to communicate with one or more clients 300a and 300b, either directly or by way of an a communications network 400, to transmit data to, and receive data from, the clients 300a and 300b. Examples of backup servers include, but are not limited to, the EMC Avamar server, and the EMC NetWorker server.

With continued reference to FIG. 1, further details are provided concerning the example datacenter server 200a. As indicated, the datacenter server 200a may include a backup and restore application 202 that cooperates with a file system tool, discussed below, residing on one or more clients such as clients 300a and 300b, to restore requested data to the clients. The datacenter server 200a also includes, or has access to, storage 204 that stores backup data for one or more clients. The data stored for each client can include one or more backups of that client, or a portion of that client.

To facilitate management of backup and restore processes, including the generation and presentation of virtual synthetics, the datacenter server 200a may also include a manifest 206 and a table of contents 208. A manifest 206 and table of contents 208 can be provided on any number of different bases including, for example, for each client, or for each backup of a client or client file. It should be noted that metadata concerning data residing at the datacenter is not required to also reside at the datacenter. For example, the table of contents 208 and/or manifest 206 can, more generally, be stored anywhere that is accessible by a file system tool, examples of which are discussed in more detail below.

With reference first to the manifest 206, the manifest 206 may be generated at the time a backup is created. In general, the manifest 206 may take the form of a listing of various types of information and data structures that have been backed up. Thus, in the illustrated non-limiting example, the manifest 206 lists a database, a .VMDK file, a mailbox, a file, and one or more various other backed up information and/or data structures. In general, any material(s) capable of being backed up and restored can be included in the manifest 206, and there are no constraints, for example, as to the type, size and number of information and data structures that can be reflected in the manifest 206. In at least some particular embodiments, relatively large files such as virtual machine disk files and mailbox files are listed in the manifest 206.

As noted earlier, the cloud datacenter server 200a may also include a table of contents 208. In general, the table of contents 208 serves to keep track, such as by mapping for example, of incremental changes that have been made to information listed in the manifest 206 and stored by the datacenter server 200a. For example, the table of contents 208 may include entries 208a, 208b and 208c that including information concerning, respectively, a file, information, and a data structure. Each of the entries can include various types of information concerning the data with which that particular entity is associated.

For example, an entry 208a may include a mapping that indicates the byte range, in storage, that is spanned by the file to which the entry 208a corresponds. As well, the mapping could also indicate other information, such as where the bytes of that byte range are stored, the type of compression and/or encryption used on those bytes, and any other information concerning the bytes of the file.

As well, the table of contents 208 may provide mapping to one or more incremental changes 210, or simply incrementals, to any of the entries in the table of contents 208, such as the entry 208a for example. That is, the table of contents 208 can reference one, some, or all, of the incremental changes that have been made over time to the file to which entry 208a corresponds. Among other things, this approach can enable a user to request a file, or other information, as that file or information existed at a particular point in time. In the particular example of FIG. 1, the table of contents 208 maps to the original file version 210a, and also maps to first and second incrementals 210b and 210c, respectively. Each of the incrementals 210 represents a different set of changes to the file to which entry 208a corresponds, and each of the incrementals 210 corresponds to a different respective point in time. Moreover, and as suggested in FIG. 1, each of the incrementals 210 is relatively smaller in size than the file to which the incremental 210 corresponds. Thus, when a file version is requested, the entire file need not be sent to the requestor. Instead, only the incremental changes through the date of interest are required to be sent.

With continued reference to FIG. 1, and as noted earlier, a cloud datacenter including one or more datacenter servers may communicate with one or more clients, two examples of which are denoted at 300a and 300b, respectively. As the clients 300a and 300b may share a number of similarities, only client 300a is addressed in the following discussion.

Among other things, the client 300a may include one or more applications 302a, a local cache 304a, a file system tool 306a that includes an interface module 308a, a web interface/API 310a and local storage 312a. With reference first to the applications 302a, example applications include, but are not limited to, word processing, email, a backup and restore client, database management, and any other application(s) capable of generating data that can be backed up at the cloud datacenter 200. As discussed in more detail elsewhere herein, one or more of the applications may directly or indirectly request data from the cloud datacenter 200 and the requested data can be stored in the local cache 304a when received by the file system tool 306a of the client 300a. In at least some instances, requests for data from the cloud datacenter 200 can be formulated by the file system tool 306a and transmitted by way of a web interface/API 310a/310b using an application program interface (API) such as the RESTful (REpresentational State Transfer) HTTP-based API, although other mechanisms can be used instead of the RESTful HTTP-based API. More generally, backend storage can be any cloud API that supports requesting specific ranges of content from a datacenter or other data repository.

The interface module 308a, which could take the form of a plug-in, can be used by the file system tool 306a to provide the user with a representation of a virtual file system that includes representations of the files of the user that are stored at the cloud datacenter 200. That is, the file system tool 306a can present a standard file system interface to a user at the client. This interface may have both visual and functional aspects. To briefly illustrate, the representation could appear to the user as a display of a virtual file structure. In one particular example, discussed in more detail in a related application, the interface module 308a may take the form of a file system driver, such as the Filesystem in Userspace (FUSE) operating system mechanism, although other drivers, mechanisms and interfaces could alternatively be employed. As well, one example of a file system tool 306a may be referred to herein as a Data Protection Cloud File System (DPCFS).

The file system tool 306a operates in connection with the interface module 308a. For example, the file system tool 306a not only requests data needed by the user but, responding to user commands provided by way of the interface module 308a, the file system tool 306a can perform or cause the performance of a variety of file system operations, examples of which include, but are not limited to, open, view, search, read, write, move, and delete. In addition to these operations, the file system tool 306a can perform, or cause the performance of, a variety of other operations not specifically requested by the user. Such other operations can include, for example, creating a manifest, submitting changes to an existing manifest such as manifest 206, submitting changes to a table of contents such as the table of contents 208, and defining and transmitting a request to provide and mount a remote file system that represents user data. Yet other operations that can be performed by the file system tool 306a include, for example, compression, encryption, decompression, decryption, and deduplication.

B. Example Host Configuration

Figure 2:
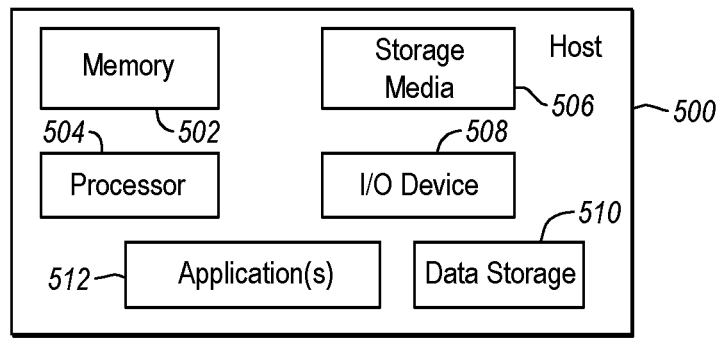
FIG. 2 is directed to an example implementation of a computing device, such as a host, that may be employed with at least some embodiments.

Any one or more of the clients 300a, 300b, and cloud datacenter server 200a can take the form of a physical computing device, one example of which is denoted at 500. In the example of FIG. 2, the computing device 500 includes a memory 502, one or more hardware processors 504, non-transitory storage media 506, I/O device 508, and data storage 510. As well, one or more applications 512 are provided that comprise executable instructions. Such executable instructions can take the form of one or more of a backup application, and a backup client, for example.

C. General Aspects of a Backup Scheme

Figure 3:
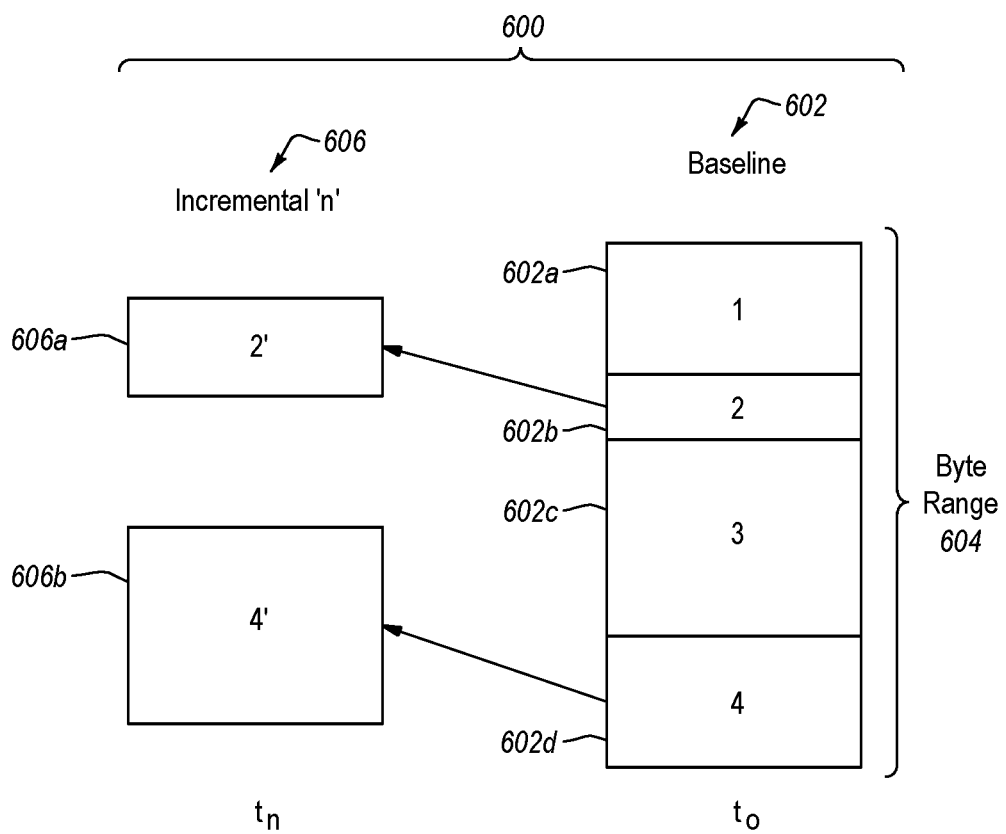
FIG. 3 is an example of a scheme for backing up data.

With attention now to FIG. 3, details are provided concerning an example scheme for backing up data. The scheme can be implemented in connection with a backup history. As noted elsewhere herein, embodiments of the invention can be advantageous insofar as they enable a client to directly access datacenter backup data, such as after a disaster has occurred, while avoiding the need to download entire files or other datasets to the client from the datacenter. More particularly, a user may only have to download parts of a dataset of interest.

In the example of FIG. 3, a backup history for a dataset, which could be a file, a file structure, a byte range, or any other dataset of any size, is indicated generally at 600. In general, the backup history 600 includes a baseline dataset 602 that in this illustrative example includes four blocks, namely, 602a (1), 602b (2), 602c (3) and 602d (4). In some embodiments, these blocks may be referred to as chunks of data. As well, the pieces or chunks of data may have a size that is variable. The four blocks of data 602a-602d collectively define a corresponding data range, which can be expressed in terms of bytes, namely, a byte range 604, but can alternatively be expressed in any other suitable terms. The baseline dataset 602 reflects the content of a particular dataset as that particular dataset was initially backed up at a datacenter, such as a cloud datacenter for example. This initial backup of the baseline dataset 602 is indicated as having occurred at time to.

Over a period of time, one or more changes may be made, by an application for example, relative to the baseline dataset 602. Each change can be backed up at the datacenter, so that the changes accumulated over time collectively define the backup history 600 associated with the baseline dataset 602. As indicated in FIG. 3, the entire updated dataset need not be stored. Instead, only the changes to the preceding version of the dataset are stored, in a form referred to as an incremental backup, or simply an incremental. Thus, the amount of storage space required to save the backup history 600 is significantly smaller than if updated versions of the entire baseline dataset 602 were required to be stored.

Any number 'n' of incrementals associated with the baseline dataset 602 can be created and stored. In the example of FIG. 3, an incremental 'n' is stored at the datacenter at a time to that is subsequent to time to when the baseline dataset 602 was stored. The incremental 'n' includes only two blocks, namely, blocks 606a and 606b.

This reflects the fact that changes have been made to only two blocks associated with the baseline dataset 602. In particular, the changed version of block 602*b* (2) is block 606*a* (2') and the changed version of block 602*d* (4) is block 606*b* (4'). FIG. 3 also indicates that the relative size of the blocks can change as modifications, reflected by incremental 'n,' are made.

As the foregoing example illustrates, and discussed in further detail below, a user requesting access to a dataset as it existed at time to need only be sent blocks 606*a* and 606*b* from the datacenter, since no changes have been made, as of time $t_n$, to the other blocks associated with the baseline dataset 602.

It will be appreciated that backup schemes can be implemented in a variety of ways consistent with this disclosure. Accordingly, another example embodiment of a backup scheme is addressed below in the discussion of FIGS. 6 and 7.

D. Example Request and Retrieve Methods

While, as noted elsewhere herein, embodiments of the invention may be advantageous at least inasmuch as a user does not need to download entire datasets such as files or file systems, the user nonetheless needs a mechanism that allows the user to interact with data stored at the datacenter so that the user can perform desired operations concerning the backed up data. Such operations may be necessary when, for example, a disaster has occurred and the user does not have access to local data. Such operations can also be performed during normal operating conditions.

Figure 5:
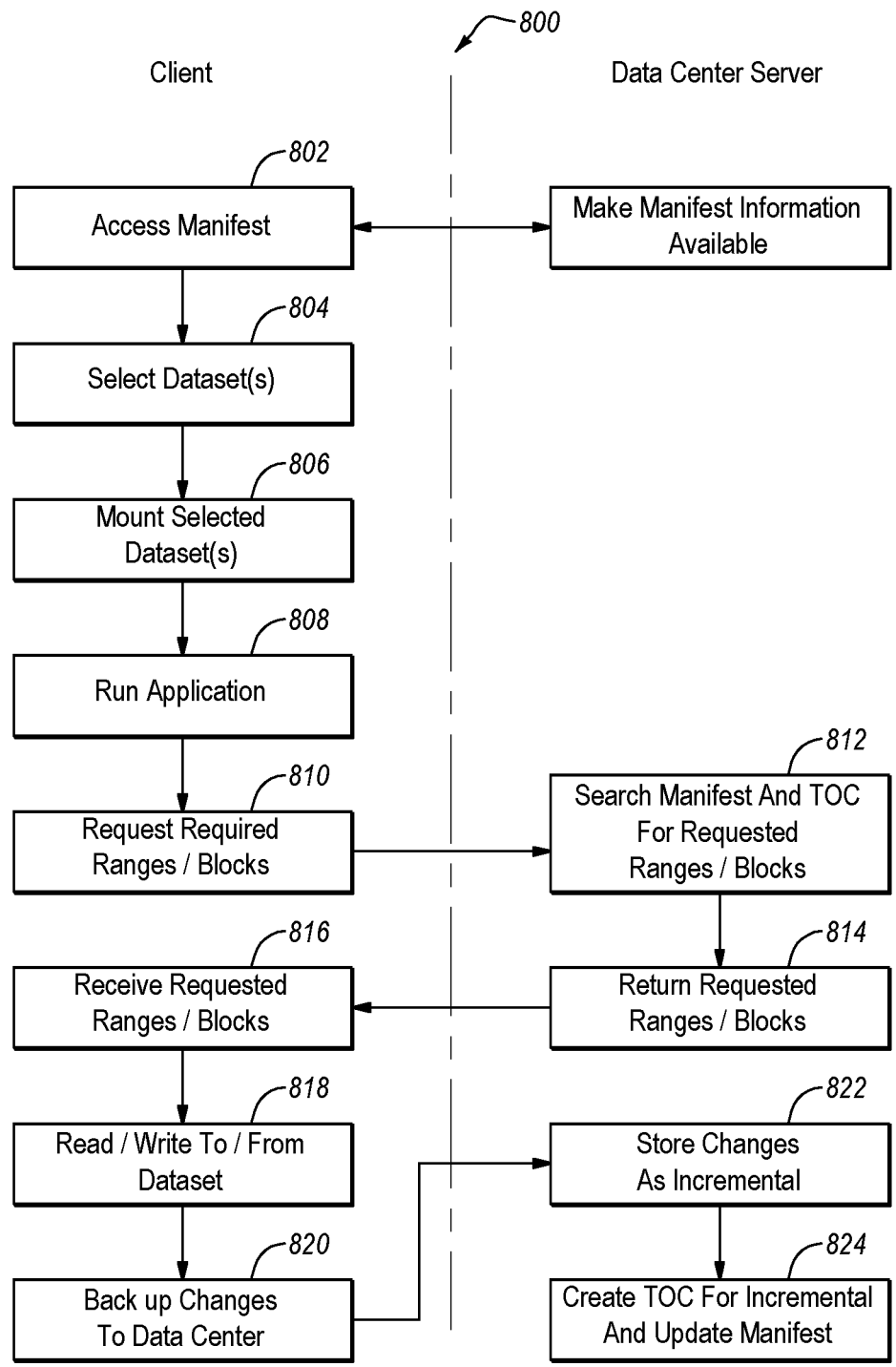
FIG. 5 is a flow diagram that provides additional information concerning aspects of the example method of FIG. 4.

With the foregoing points in mind, an example method denoted in FIG. 5 at 700 begins when a user at a client machine requests 702 file system information from the datacenter. The requested file system information can be any information concerning a file system with which a file of interest to the user is associated. For example, the file system information could include aspects of a standard file system interface, such as one or more of a file structure, directories, and filenames. At 704, the file system information request is received at the datacenter server and at 706, the requested information is gathered and transmitted to the client.

Next, the file system information is received and presented, by way of a browser for example, at the client 708. The file system information can be presented in the form of a file system interface, for example, but that particular form is not necessarily required and any other form that enables a user to perform file system operations such as open, view, search, read, write, move, and delete, can alternatively be employed.

The file system information received from the datacenter server can be presented to the user as a virtual display. That is, the file system information can be presented 708 to the user at the client in such a way that it appears to the user that the datacenter file system is located locally at the client when, in fact, the file system is actually located only at the datacenter server. One advantage of this approach is that it eliminates the need to download an entire file structure to the client.

After the file system information has been presented 708 to the user at the client, the user can then perform 710 various file system operations concerning files and other datasets that are presented as part of the file system information. These operations can be performed in conjunction with an application and/or with a file system tool. By way of illustration, an user can write to a document using a word processing application such as MS Word®, or a user can read an email using MS Exchange®. As well, a file system tool can enable a user to perform file system operations such as move, delete, or rename, for example, regarding one or more files. The performance of file system operations is coordinated 712 with the datacenter server.

As disclosed elsewhere herein, one advantage of at least some embodiments is that file system operations can be performed at a client without the need to download the entire file in connection with which the user intends to perform such file system operations. In any case, after a user has performed the desired file system operations, any changes to the data associated with those file system operations can then be uploaded 714 to the datacenter server. After receipt 716 of the changes to the data, the datacenter server can then update 718 a table of contents and a manifest associated with the file, database, or other dataset, with which the changes are concerned. Finally, at 720, the datacenter can coordinate with the client to dismount the file system data that was transferred, as part of 710/712, from the datacenter server to the client. After the file system data has been dismounted from the client, the user no longer has access to that data at the datacenter server, although file system data may still persist in a local cache at the client.

Figure 4:
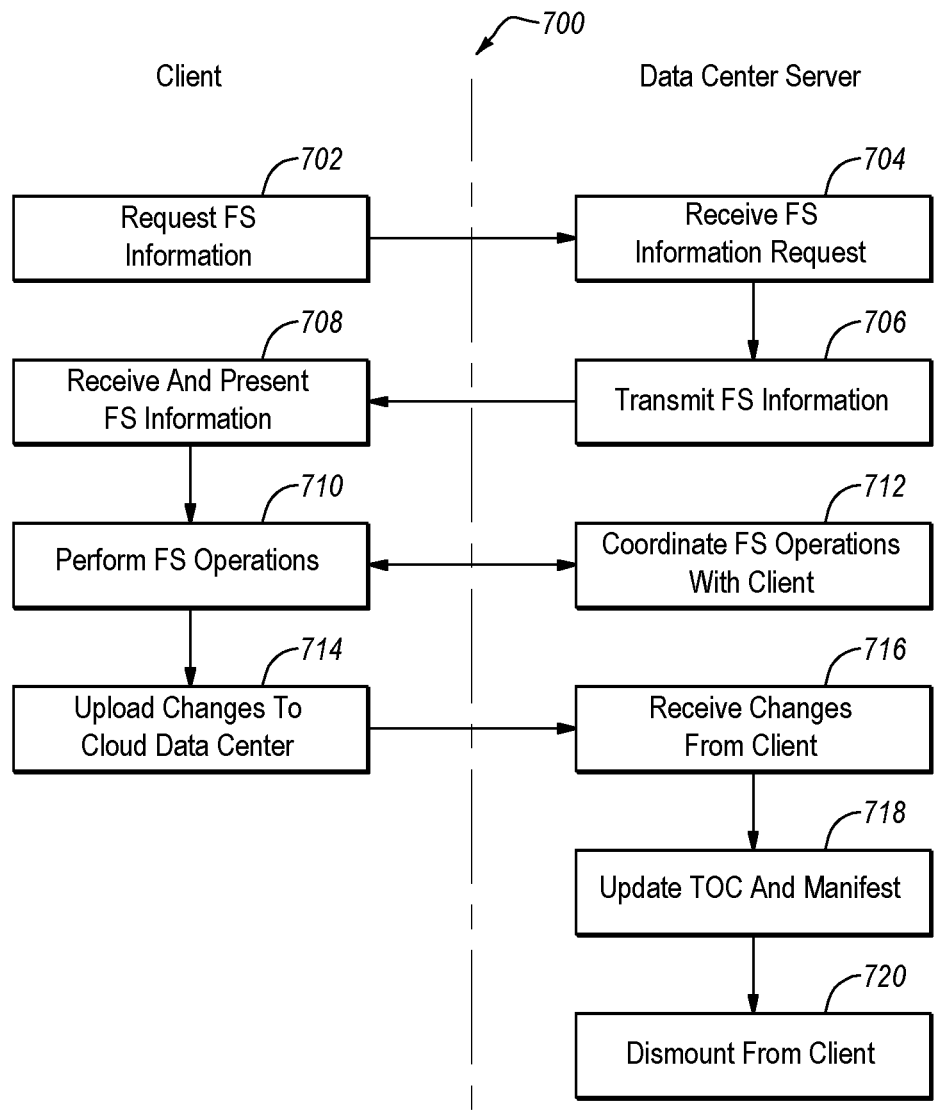
FIG. 4 is a flow diagram disclosing general aspects of a method for backing up data.

With reference now to FIG. 5, further details are provided concerning a method 800 for the performance, by cooperation of the client and datacenter server, of file system operations, and concerning the associated interaction between the client and the datacenter server, first introduced in connection with processes 710/712 of FIG. 4. It should be noted that as the term 'operations' is used herein, that term is intended to be broad in scope. As such, operations are not necessarily concerned only with modifications to a dataset, but may relate to manipulations of the dataset, such as restore operations, that do not involve changes to the content of the dataset, such as moving or renaming a dataset without modifying the dataset content. As another example of operations that can be performed in connection with embodiments of the invention, a dataset such as a .VMDK file may not be modified, but simply locally restored, such as by being mounted on a client, so that the user can use that .VMDK file to locally boot the VM to which the .VMDK file pertains. This process of local restoration may be performed, for example, when the local copy of the .VMDK file is not working properly, or at all. Other example operations concerning datasets, such as files for example, are disclosed elsewhere herein.

The method 800 can begin at 802 when a user at a client accesses a manifest, by way of a browser for example, to view the available version(s) of datasets, such as files, that are listed in the manifest. The user can then select 804 the desired dataset(s) from the manifest. The dataset(s) can be selected based on various criteria. One such criterion is a particular cutoff date/time. In particular, the user can specify that he would like all datasets as they existed as of the cutoff date/time. As another example, the user can specify that he would like all datasets created before, or after, a particular time. A file system tool, embodiments of which are disclosed herein, is then used to mount 806 the selected dataset(s) at the client. In some instances at least, all of the datasets listed in the manifest can be mounted. The mounted datasets can include incrementals and/or a baseline dataset.

Once the dataset(s) of interest are mounted at the client, the user opens and runs 808 an application in anticipation of performing one or more operations concerning the mounted dataset(s), such as a file for example, with which the application is associated. As part of the operations of the application, the application can access various mounted datasets as virtual synthetics. Thus, a file system request by the application can be translated by the file system tool into a request 810 for particular byte ranges or blocks of a mounted dataset is transmitted to the datacenter server by way of a suitable interface, such as a REST API for example.

In some instances, a number of additional bytes on either side of the byte range may be returned by the datacenter, whether or not those additional bytes were specified by the request 810. In at least some embodiments, the use of an interface module 308a in the form of a file system driver, such as the FUSE operating system mechanism for example, can be used to specify one or more byte ranges, or other types of data ranges. As the foregoing makes clear, the datacenter can support client requests for mounting a file as that file existed at a particular date/time, and the datacenter can also support block level and byte range requests from the client.

In at least some embodiments, the file system tool at the client may first check the local cache to see if some or all of the bytes in the byte range to be requested are already present locally. By performing this check, the amount of data that may be needed from the datacenter server may be reduced if the local cache already includes some of that data. Moreover, even if this check is not performed, the datacenter can inform the file system tool at the client that at least some of the data in the requested dataset has already been transmitted to the client, and the datacenter can inform the file system tool where else that data appears in the file with which the dataset request is concerned.

After the dataset request is received at the datacenter server, the datacenter server can then search 812 a manifest and table of contents to determine the location of the requested byte range. The datacenter server can then assemble, potentially from multiple incrementals and/or a baseline dataset, and return 814 the requested data to the client. Where the file or other dataset that is mounted on a client device is synthesized from multiple baseline and incremental change sets, that file or other dataset may be referred to as a virtual synthetic. That is, and as noted elsewhere herein, the file that is mounted is synthetic in the sense that the portion is created, or synthesized, on an ad-hoc basis according to user requirements and the file does not exist separately on its own at the datacenter.

In at least some embodiments, the dataset transmitted from the datacenter server to the client is in an encrypted and compressed form so that only an authorized user with an appropriate key is able to access the dataset. In at least some embodiments, access to the dataset can be confined to a particular user and client. Thus, after receipt 816 at the client of the requested byte ranges or blocks, one embodiment of the method 800 includes decryption and decompression of the received data. As well, the data transmitted from the datacenter server to the client may be de-duplicated data. In at least some embodiments, one, some, or all of decryption, decompression, and deduplication can be performed by, or at the direction of, the file system tool.

The received dataset can be stored at the client, in a local cache for example. The storage of the dataset can be performed, for example, by the application in connection with which the request for the dataset was made. Thus, for example, if the request was made for a mailbox, or an individual email, the received dataset can be cached by the file system tool. At 818, the user can perform various file system operations concerning the cached data. As disclosed elsewhere herein, such file system operations can include, for example, reading from, and writing to, the cache. As another example, the user can employ the cached data to boot a virtual machine, as in the case where the cached data relates to a file such as a .VMDK file.

Once the user has completed the process of making changes to the cached data, the changes can then be transmitted 820 to the datacenter server for backup. This backup can be performed with any suitable backup client and backup application, and the data to be backed up can be compressed and encrypted prior to transmission from the client to the datacenter server. The received changes are then backed up 822, in the form of an incremental in at least some embodiments, at the datacenter server. As part of the backup process 822, the client can request creation or modification of the manifest, and the client can also request updates to the table of contents.

The dataset and changes stored in the local cache at the client may remain in that cache after those changes have been backed up at the datacenter server. Where this is the case, the client may be able to access the cached data later in connection with another request for a dataset. After the incremental has been stored 822 at the datacenter server, a table of contents can be created for the incremental, and the manifest updated 824.

E. Aspects of Another Example Backup Scheme

As noted elsewhere herein, backup schemes can be implemented in a variety of ways consistent with this disclosure. Accordingly, attention is directed now to FIGS. 6 and 7, which disclose aspects of another example embodiment of a backup scheme.

Figure 6:
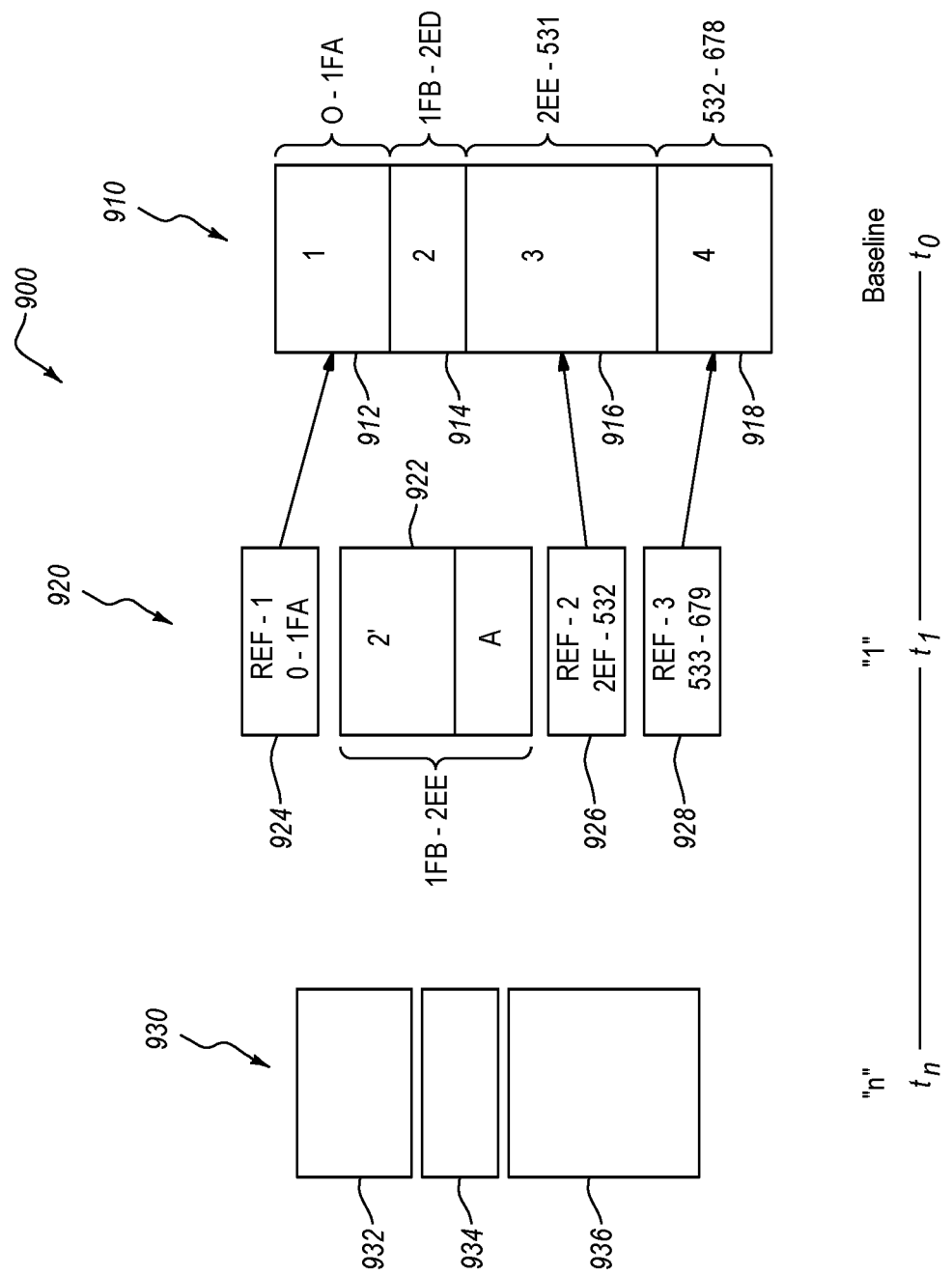
FIG. 6 discloses aspects of a particular embodiment of a scheme for backing up data that includes one or more incrementals and associated reference blocks.

With reference first to FIG. 6, a backup history 900 of a baseline dataset 910 is graphically displayed. In general, the backup history 900 can include any number of incrementals. In the example of FIG. 6, a first incremental 920 and an 'nth' incremental 930 are disclosed. As noted in the discussion of FIG. 1, the baseline dataset 910, first incremental 920, and 'nth' incremental 930 may each be listed in a table of contents at the datacenter server. As such, the tables of contents may reflect a complete backup history 900 of a dataset, which must include a baseline dataset 910. The baseline dataset 910 can be considered to have been stored at time t0, the first incremental 920 stored at time ti subsequent to time t0, and the 'nth' incremental 930 stored at time to subsequent to time ti.

The baseline dataset 910 in this example includes four pieces, which can be bytes, blocks, chunks, or any other pieces, 912, 914, 916 and 918 of data, and the baseline dataset. For the purposes of the discussion, the four portions will be referred to as blocks, but the scope of the invention is not limited to blocks. The baseline dataset 910 can include blocks 912-918 of the same sizes, or different sizes. In the illustrated example, blocks 912 and 918 are the same size, while block 914 is smaller than blocks 912 and 918, and block 916 is larger than blocks 912 and 918. Similarly, first incremental 920 includes block 922 and reference blocks 924, 926 and 928, and incremental 930 includes block 932, reference block 924 and block 936. The blocks 912-918 of the baseline dataset 910, as well as the blocks of each of the incrementals 920 and 930, are independent of each other and, as such, can be encrypted, decrypted, compressed, decompressed, and/or otherwise processed separately from each other.

As also indicated in the example of FIG. 6, and with continued reference to the baseline dataset 910, each of the blocks 912-918 has an associated start and end that, in general, collectively indicate the size and location of the associated block. Thus, block 912 starts at 0 and extends to 1FA, block 914 adjacent to block 912 starts at 1FB and extends to 2ED, block 916 adjacent to block 914 starts at 2EE and extends to 531, and block 918 adjacent to block 916 starts at 532 and extends to 678.

At some point after the backup of the baseline dataset 910, a first incremental 920 may be created at a client and backed up at the datacenter server. This first incremental 920 can be created, for example, when a user on a client system modifies a database, or uses an application to modify a file associated with that application, and then backs up the modifications at the datacenter.

In general, and as discussed in more detail below, incrementals such as the first incremental 920 can be considered as a new file that is created based on user changes associated with one or more blocks of a baseline dataset, such as the baseline dataset 910. The incrementals generally have at least two types of components, namely, one or more new/modified blocks created by a user, and one or more reference blocks. The modified blocks are changed versions of blocks that exist in the baseline dataset. New blocks added by the user, and not associated with any block existing in the baseline dataset, can also be included in the incremental. The reference blocks, which require only negligible storage space, are not blocks of data but simply point to corresponding blocks of a prior baseline or incremental dataset. Thus, the size of a given incremental can be relatively smaller than the baseline dataset with which that incremental is associated.

Briefly, an incremental can be restored when a user at a client system requests, from the datacenter, a data range that embraces the incremental. In response to the request, the modified/new blocks of the incremental are retrieved. Additionally, the reference blocks in the incremental are consulted to identify corresponding blocks of the baseline dataset so that those blocks can then be retrieved as well.

With continued reference now to FIG. 6, further details are provided concerning structures and operations concerning incrementals and a baseline dataset with which those incrementals are associated.

In the example of FIG. 6, the first incremental 920 does not include any changes relative to block 912 of the baseline dataset 910. Accordingly, the first incremental 920 includes only a reference block 924 that points to the location of block 912 in the baseline dataset 910. This reference block is designated REF 1 and identifies the range of block 912, namely, 0-1FA, so that when there is a client request for the first incremental 920, the datacenter is able to locate and return block 912 as part of the response to that request.

In contrast with the circumstance concerning block 912, the first incremental 920 includes a change relative to block 914. In the particular example of FIG. 6, block 922 of the first incremental 920 includes not only the content of block 914 but also the additional data 'A' that was added as a result of a client operation. As a result of the inclusion of data 'A,' block 922 is larger than block 914, although blocks of an incremental can also be smaller than their counterpart blocks in a prior incremental or baseline dataset 910, such as when a user removes data from a block of a dataset.

As such, block 922 reflects a change relative to block 914, although block 914 itself is not modified as a result of the creation or storage of the first incremental 920. Block 922 also reflects that fact that blocks can be variable in size, since block 922 is larger than block 914. Depending upon the nature of the modification made at the client, block 922 could instead be smaller than block 914.

In effect, and as shown in FIG. 6, block 922 replaces block 914, at least for the purposes of fulfilling a request for a dataset that reflects the first incremental. Thus, when the first incremental 920 is returned to a client in response to a request from that client, block 922 will be returned instead of block 914. If, on the other hand, a request were made for the baseline dataset 910, block 914 would be returned rather than block 922.

With continued reference to FIG. 6, it can be seen that while block 914 of the baseline dataset 910 extends from 1FB-2ED, block 922 of the first incremental 920, which includes the additional data 'A' extends further, namely, from 1FB-2EE in the first incremental 920. As a result, the location of the data range in the first incremental 920 that corresponds with block 916 is shifted, or offset, by the size of the difference between block 914 and block 922. Because of this shift, the location of the data range in the first incremental 920 that corresponds with block 916 is 2EF-532, though the data of block 916 actually exists at 2EE-531 in the baseline dataset 910. Thus, if a client requested range 2EF-532, an incomplete and/or incorrect dataset would be returned because that range in the baseline dataset 910 includes portions of two different blocks, namely, blocks 916 and 918.

In light of circumstances such as those discussed above, the offset imposed by block 922 must be accounted for so that a request for the first incremental 920 will return the correct block(s) from the baseline dataset 910. Accordingly, a reference block 926 is provided in the first incremental 920. This reference block is designated REF 2 and correlates the range of the first incremental 920 that corresponds to block 916, namely, 2EF-532, with the actual location of block 916 in the baseline dataset, namely, 2EE-531. Thus, when there is a client request for the first incremental 920, the datacenter is able to use reference block 926 to locate and return block 916 from the baseline dataset 910 as part of the response to that request. It can be seen from FIG. 6 that reference block 928, designated REF 3, similarly correlates the range of the first incremental 920 that corresponds to block 918, namely, 533-679, with the actual location of block 918 in the baseline dataset, namely, 532-678.

Figure 7:
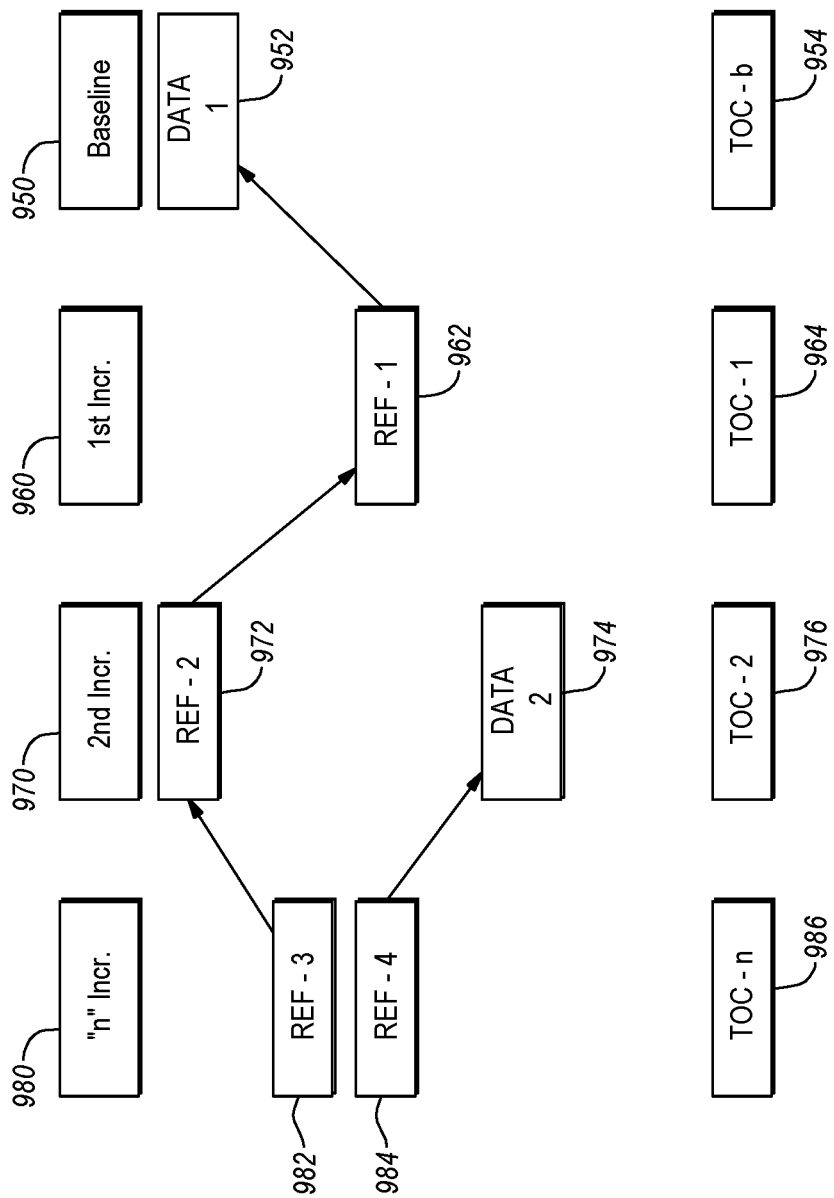
FIG. 7 is a schematic illustrating aspects of relations between reference blocks and blocks of data.

It will be appreciated from the foregoing discussion, and with reference now to FIG. 7, that a variety of further conditions can arise in connection with embodiments of the invention. For example, one reference block can point to another reference block. As well, a reference block can point to a new block of an incremental.

Moreover, the path from a reference block to a data block can involve multiple intervening reference blocks. These points are illustrated with various examples in FIG. 7.

As shown, a baseline dataset 950 has an associated first incremental 960, second incremental 970, and nth incremental 980. The first incremental 960 includes a reference block 962 that points to block 952 of the baseline dataset 950. The second incremental 970 includes a reference block 972 that points to reference block 962 which, as noted above, points to block 952 of the baseline dataset 950. The second incremental 970 additionally includes a new/modified block 974. Finally, the nth incremental 980 includes a reference block 982 that points to reference block 972, and the nth incremental 980 also includes a reference block 984 that points to block 974 of the second incremental 970.

As the foregoing discussion and examples suggest, even a relatively small dataset with a relatively small number of incrementals, and the associated shifts, can present a significant challenge in terms of the ability to locate and retrieve one or more blocks. Accordingly, embodiments of the invention include mechanisms and functionality that can reside at the datacenter server and provide a way to keep track of the location of the blocks of the dataset.

With continued reference to FIG. 7 in particular, and with continued reference to FIG. 6, one mechanism for tracking block locations involves the use of one or more tables of contents. In general, and as indicated in FIG. 7, a table of contents (TOC) can be created at the datacenter for each new incremental. Thus, the first incremental 960 is associated with a TOC 964, the second incremental 970 is associated with a TOC 976, and the nth incremental is associated with a TOC 986. The TOCs can be created contemporaneously with, or after, creation of the incremental to which that TOC pertains. In brief, the TOC contains a listing of the blocks and reference blocks of the associated incremental. The TOC also includes, or is otherwise associated with, a map that keeps track of the location of shifts that occur in the corresponding incremental, and that keeps track of the amount of the offset associated with each shift. The TOC and/or map also include the start and end of each block in the associated incremental.

The baseline dataset 950 may also be associated with a TOC 954 that operates in a similar fashion to the TOCs 964, 976 and 986. The TOC 954 differs from those TOCs however in that the TOC 954 does not include shift or offset information because the blocks of the baseline dataset 950 are not modified or shifted once backed up.

F. Aspects of Example Methods

Figure 8:
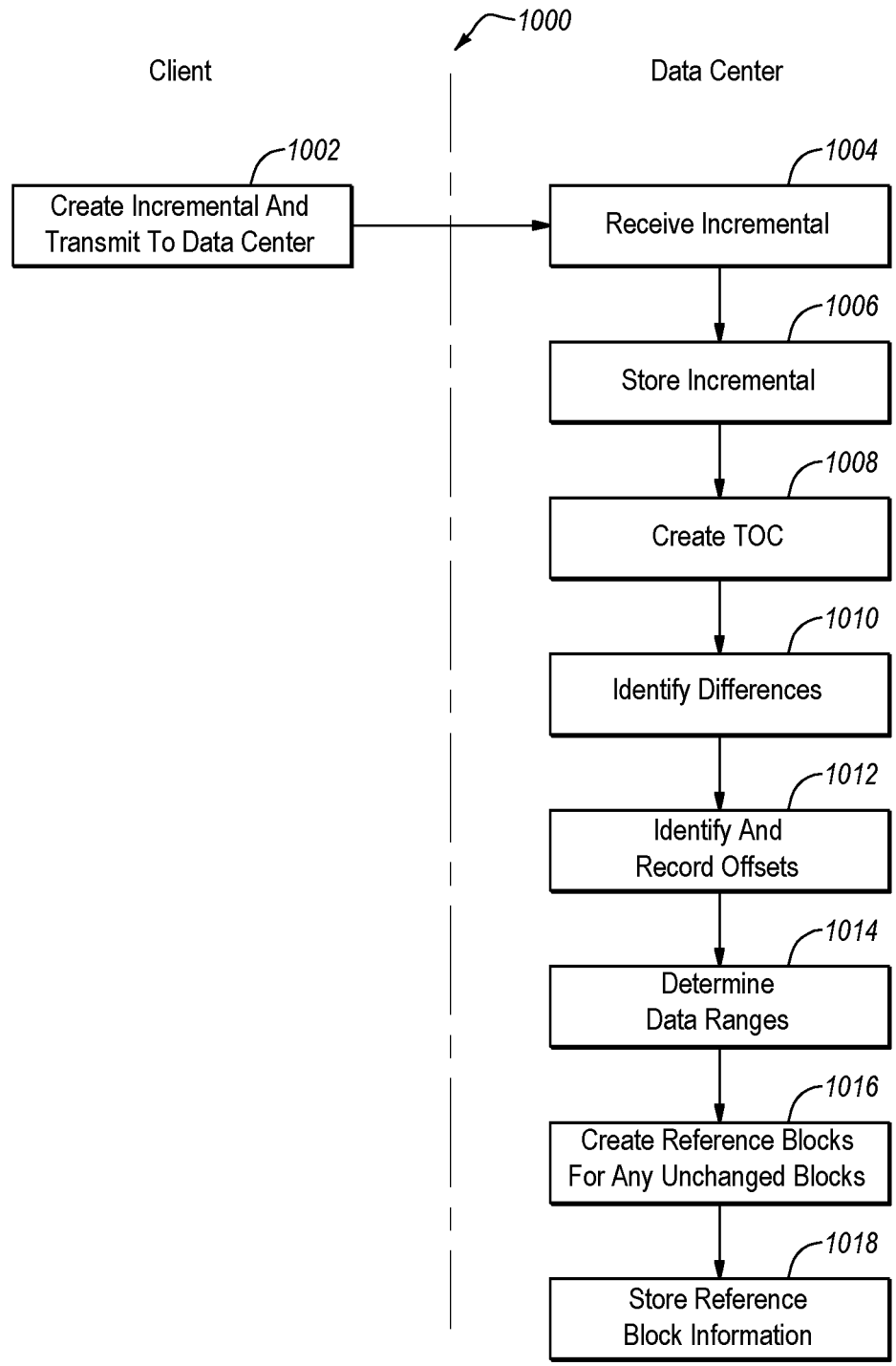
FIG. 8 is a flow diagram disclosing aspects of an example method for storing data.

Directing attention now to FIG. 8, details are provided concerning aspects of example methods for backing up data at a datacenter. One such example method is denoted generally at 1000 in FIG. 8. In general however, a backup client resident on the client system can cooperate with a backup application at the datacenter, which can be a cloud datacenter, to back up and process the incremental that has been created.

The method 1000 can begin at 1002 where a client system creates an incremental of a previously existing file. The file may be, for example, a database, mailbox, or other type of file, and the incremental can be created by any application compatible with the file. A copy of the incremental can be stored locally at the client, but in any case is transmitted to the datacenter and received 1004 at the datacenter.

The incremental is then stored 1006 at the datacenter, and a TOC is created 1008 for the incremental that contains a listing of the new and modified blocks of the incremental. Next, the incremental is examined to identify 1010 differences between the incremental and one or more earlier incrementals and/or a baseline dataset. For the new and modified blocks, offsets are identified and recorded 1012. The offsets thus identified can then be used to determine 1014 corresponding data ranges for the new and modified blocks in the incremental. The data ranges and offsets can be recorded in a map.

Next, a reference block is created 1016 for each block of the baseline dataset and/or prior incremental(s), as applicable, that do not have associated changes in the incremental. Reference blocks are not required for changed blocks since the changed blocks are actually present in the incremental. In general, each reference block includes information that identifies the range of the incremental that corresponds to an unchanged block of a prior incremental or baseline dataset, and the reference block also correlates this range information with the actual location of the unchanged block in the prior incremental or baseline dataset, as applicable. The reference blocks are listed in the table of contents.

Finally, the reference block information is stored 1018 so that it can be referred to by the datacenter when responding to a request for the incremental from a client. The reference block information can be stored together with the offsets in the map.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
performing the following operations at a single client:
accessing a manifest that includes a listing of versions of a dataset that are available at a datacenter;
selecting a dataset from the manifest;
mounting the selected dataset;
performing an operation concerning a file, using an application that is associated with the dataset, wherein the operation involves requesting a specific subset of data of the mounted dataset, and the specific subset is a byte range that includes less than all of the file;
causing, by requesting only the specific subset of data, creation at the data center of a virtual synthetic that corresponds to the requested byte range and comprises respective portions of one or more different backups of the file, wherein, prior to the request from the client for the specific subset of data, the virtual synthetic did not exist separately on its own at the datacenter;
receiving the requested subset of data;
performing a file system operation involving a change to the subset of data; and
backing up the change to the subset of data.

2. The method as recited in claim 1, wherein the dataset is selected based on a cutoff date/time, or based on a time of creation of the dataset relative to a particular point in time.

3. The method as recited in claim 1, wherein the mounted dataset includes an incremental and/or a baseline dataset.

4. The method as recited in claim 1, wherein the request for the specific subset of data of the mounted dataset is a translation of a filesystem request by the application.

5. The method as recited in claim 1, further comprising, before requesting the specific subset of data, checking a local cache at the client to see if part or all of the specific subset of data is already present locally.

6. The method as recited in claim 1, further comprising receiving, from the datacenter, an indication that some of the data in the specific subset of data has already been transmitted.

7. The method as recited in claim 1, wherein the data received by the client from the datacenter is in an encrypted form.

8. A non-transitory storage medium having stored therein computer-executable instructions which are executable by one or more hardware processors to:
perform the following operations at a single client:
accessing a manifest that includes a listing of versions of a dataset that are available at a datacenter;
selecting a dataset from the manifest;
mounting the selected dataset;
performing an operation concerning a file, using an application that is associated with the dataset, wherein the operation involves requesting a specific subset of data of the mounted dataset, and the specific subset is a byte range that includes less than all of the file;
causing, by requesting only the specific subset of data, creation at the data center of a virtual synthetic that corresponds to the requested byte range and comprises respective portions of one or more different backups of the file, wherein, prior to the request from the client for the specific subset of data, the virtual synthetic did not exist separately on its own at the datacenter;
receiving the requested subset of data;
performing a file system operation involving a change to the subset of data; and
backing up the change to the subset of data.

9. The non-transitory storage medium as recited in claim 8, wherein the dataset is selected based on a cutoff date/time, or based on a time of creation of the dataset relative to a particular point in time.

10. The non-transitory storage medium as recited in claim 8, wherein the mounted dataset includes an incremental and/or a baseline dataset.

11. The non-transitory storage medium as recited in claim 8, wherein the request for the specific subset of data of the mounted dataset is a translation of a filesystem request by the application.

12. The non-transitory storage medium as recited in claim 8, wherein the operations further comprise, before requesting the specific subset of data, checking a local cache at the client to see if part or all of the specific subset of data is already present locally.

13. The non-transitory storage medium as recited in claim 8, wherein the operations further comprise receiving, from the datacenter, an indication that some of the data in the specific subset of data has already been transmitted.

14. The non-transitory storage medium as recited in claim 8, wherein the data received by the client from the datacenter is in an encrypted form.

15. A system, comprising:
one or more hardware processors; and
non-transitory storage medium having stored therein computer-executable instructions which are executable by the one or more hardware processors to perform the following operations at a single client:
accessing a manifest that includes a listing of versions of a dataset that are available at a datacenter;
selecting a dataset from the manifest;
mounting the selected dataset;
performing an operation concerning a file, using an application that is associated with the dataset, wherein the operation involves requesting a specific subset of data of the mounted dataset, and the specific subset is a byte range that includes less than all of the file;
causing, by requesting only the specific subset of data, creation at the data center of a virtual synthetic that corresponds to the requested byte range and comprises respective portions of one or more different backups of the file, wherein, prior to the request from the client for the specific subset of data, the virtual synthetic did not exist separately on its own at the datacenter;
receiving the requested subset of data;
performing a file system operation involving a change to the subset of data; and
backing up the change to the subset of data.

16. The system as recited in claim 15, wherein the dataset is selected based on a cutoff date/time, or based on a time of creation of the dataset relative to a particular point in time.

17. The system as recited in claim 15, wherein the mounted dataset includes an incremental and/or a baseline dataset.

18. The system as recited in claim 15, wherein the data received by the client from the datacenter is in an encrypted form.

19. The system as recited in claim 15, further comprising receiving, from the datacenter, an indication that some of the data in the specific subset of data has already been transmitted.

20. The system as recited in claim 15, wherein the operations further comprise, before requesting the specific subset of data, checking a local cache at the client to see if part or all of the specific subset of data is already present locally.

\* \* \* \* \*